United States Patent [19]

Carroll et al.

[11] 4,283,320

[45] Aug. 11, 1981

[54] SEMI-GLOSS LATEX PAINT

[75] Inventors: Howard E. Carroll, Grafton; Gerald M. Sweitzer, North Ridgeville, both of Ohio

[73] Assignee: SCM Corporation, New York, N.Y.

[21] Appl. No.: 45,239

[22] Filed: Jun. 4, 1979

[51] Int. Cl.$^3$ .............................................. C08L 33/02
[52] U.S. Cl. ........................................... 260/29.6 RW
[58] Field of Search ............... 260/29.6 RW, 29.6 WB

[56] References Cited

U.S. PATENT DOCUMENTS

| | | | |
|---|---|---|---|
| 2,889,236 | 6/1959 | Hahn | 260/29.6 WB |
| 3,423,351 | 1/1969 | Pierce | 260/29.6 ME |
| 3,819,542 | 6/1974 | Kreider | 260/29.6 RW |
| 3,891,591 | 6/1975 | Chang | 260/29.6 RW |
| 4,069,186 | 1/1978 | Ramig | 260/29.6 RW |

Primary Examiner—Paul R. Michl
Attorney, Agent, or Firm—Thomas M. Schmitz

[57] ABSTRACT

An opacified latex paint comprising small particle film-forming latex binders in combination with minor amounts of opacifying pigment, and substantial amounts of non-film-forming polymeric particles (plastic pigment) provides a semi-gloss latex paint composition having excellent hard enamel surfaces along with desirable film integrity properties. The plastic pigment particles are between about 0.1 and 0.5 microns and contain 0.2 to 2% copolymerized monomers containing carboxylic acid groups. The semi-gloss plastic pigment latex paint is compounded at pigment-volume-content (PVC) between about 30% and 45% and considerably higher than conventional high quality enamel latex paints. The opacified semi-gloss paint films exhibit excellent physical properties such as hard enamel surfaces, scrub resistance, burnish resistance, mar resistance, stain resistance, and other desirable paint film integrity properties.

3 Claims, No Drawings

SEMI-GLOSS LATEX PAINT

BACKGROUND OF THE INVENTION

This application pertains to plastic pigment semi-gloss enamel latex paint and relates to the commonly assigned U.S. Pat. No. 4,069,186 pertaining to latex paint containing solid plastic pigment particles.

Prior to plastic pigment latex paints as disclosed in U.S. Pat. No. 4,069,186, conventional high quality latex paint compositions contained opacifying pigments such as $TiO_2$ and non-opacifying pigments such as inerts or extenders to produced high quality paint films which can be easily washed or scrubbed without ruining the paint film surface. Semi-gloss and hard surface enamel latex paints have been compounded at a very low pigment-volume-content (PVC) in the range of about 20% PVC. The hard surface enamel finish is obtained by the high level of film-forming binder which necessarily is at an 80% level on a dry solids volume basis to correspond with a 20% PVC. The high binder content is far beyond that required to fully encapsulate the dry pigments and hence the excess binder appears to gravitate to the film surface and provide a hard semi-gloss enamel surface. Providing a semi-gloss latex paint is in itself a recent advancement since latex paints are normally flat.

Commonly assigned U.S. Pat. No. 4,069,186 discloses an improved latex paint composition utilizing solid non-film-forming plastic particles in combination with opacifying pigments to provide a latex paint composition having a pigment-volume-content (PVC) greater than the critical-PVC to provide substantially improved opacified paint films at a wide range of PVC levels above the critical-PVC. The dried paint films have excellent high opacity coincident with high enamel holdout and low surface porosity to produce dry paint films which maintain excellent film integrity and remain resistant to surface deterioration as well as being easy to scrub. A low-gloss latex paint film can be achieved at high PVCs by utilizing plastic pigment non-film-forming polymeric particles at very high PVCs of about 70% PVC.

It now has been found that excellent semi-gloss paint film havig good wet adhesion and exhibiting hard enamel surfaces can be produced with plastic pigment at PVC levels below critical-PVC but at surprisingly high PVCs in the range of about 35% to 40% PVC by utilizing small size plastic pigment particles containing minor amounts of copolymerized acrylic or methacrylic acid. High PVC paints compounded closer to the critical PVC can be obtained providing a substantial improvement over conventional latex enamels compounded at low PVC levels of about 20% PVC. The certain carboxyl containing plastic pigment is utilized in combination with opacifying pigment and small particle size film forming latex binder to produce an excellent, high quality, hard enamel surface paint film. A further advantage of this invention is that wet adhesion is surprisingly obtained with vinyl copolymer binders which ordinarily do not exhibit good wet adhesion in conventional latex paints. These and other advantages will become more apparent by referring to the detailed description and illustrative examples.

SUMMARY OF THE INVENTION

Briefly, the invention pertains to semi-gloss enamel latex paint particularly utilizing plastic pigment in combination with opacifying pigments and compounded PVCs below critical-PVC and between 30% and 45% PVC. The plastic pigment provides substantial hardness and hard enamel surface qualities to the ordinarily expected flat or low-gloss latex paint.

DETAILED DESCRIPTION OF THE INVENTION

The semi-gloss latex paint of this invention is a high quality semi-gloss latex paint exhibiting excellent wet adhesion and adapted to provide an excellent hard enamel surface. The semi-gloss latex can be compounded at moderately high PVCs of about 30% to 45% PVC, and although below critical-PVC, the operable PVCs are considerably higher than conventional semi-gloss latex paints which ordinarily are compounded at about 20% PVC. The latex paint of this invention is particularly dependent upon the characteristics of the non-film-forming polymer particles (plastic pigment) as hereinafter described in detail.

The non-film forming polymer particles comprise copolymerized ethylenically unsaturated monomers and contain between 0.2% and 2% by weight copolymerized carboxylic monomers selected from acrylic and methacrylic acid. The non-film-forming polymeric particles are solid and non-cellular as well as being non-film-forming under conditions of application whereby the particles remain as discrete particles in the paint film. The non-film-forming polymer particles have a glass transition temperature of at least about 5° C. and preferably about 25° C. higher than the ambient temperature that the paint film coalesces into a hardened dry paint film. Thus, paint films of this invention applied and formed at room temperatures of about 25° C. will contain non-film-forming polymer particles having a glass transition temperature (Tg) of at least about 30° C. and preferably at least about 50° C. The glass transition temperature (Tg) for the solid non-film-forming polymer particles herein is measured when such polymer particles are in the aqueous latex emulsion paint mixture whereby the interacting effects of the various paint ingredients particularly coalescing solvents are taken into account. The Tg of non-film-forming polymer particles can be estimated by Vicat softening point as determined by ASTM D-1525.

The non-film-forming polymer particles have a weighted average particle diameter between about 1,000 Å and 5,000 Å (0.1 to 0.5 microns) in accordance with this invention so as to obtain increased film integrity properties and particularly to obtain continuous paint films substantially free of cracking. Average particle diameters can be measured in accordance with centrifugal separation by a disc centrifuge, Polymer Engineering and Science, 14 (5), May 1974, pp. 332–337. The non-film-forming polymer particles are solid, non-cellular polymer particles, preferably are substantially spherical in geometric shape, and have integral continuous surfaces substantially free of vesiculated or porous cellular surfaces. The non-film-forming polymer particles can be copolymerized ethylenically unsaturated monomers having a carbon-to-carbon ethylenic double bond unsaturation capable of addition polymerization through the ethylenic double bond and include, for example, styrene and substituted styrenes, vinyl chloride, vinylidene chloride, acrylonitrile, methacrylonitrile, esters of methacrylic acid and tertiary butyl acrylate, or copolymers thereof provided the non-film-polymer contains by weight 0.2% to 2% copolymerized carboxylic unsaturated monomers. The preferred particles are copolymers of styrene containing between about 0.2% to 2% by weight copolymerized carboxylic monomer selected from acrylic acid or methacrylic acid. The semi-gloss latex paints of this invention contain on a dry solids volume basis between about 10% and 25% plastic pigment (non-film-forming polymer particles).

The semi-gloss plastic pigment latex paint of this invention further contains film-forming binder derived from copolymerized ethylenically unsaturated monomers. The binders contain latex dispersed polymer particles having a particle size less than about 0.5 micron, broadly between 500 Å and 5000 Å, and preferably between about 0.1 to 0.3 micron (1000 Å to 3000 Å). The preferred film-forming binders are vinyl copolymer binders containing at least 40% and preferably between about 80% to 100% of copolymerized vinyl unsaturated monomers containing vinyl double bond unsaturation including, for example, vinyl esters such as vinyl acetate, vinyl proprionate, vinyl butyrates, vinyl benzoate, isopropenyl acetate and like vinyl esters; vinyl amides, such as acrylamide and methacrylamide; and vinyl halides such as vinyl chloride. Vinyl copolymer binders having polymer particles between about 0.1 to 0.3 microns are particularly preferred for imparting good gloss to the paint film. The vinyl polymers can be vinyl copolymers containing copolymerized ethylenically unsaturated monomers which can be copolymerized with said vinyl unsaturated monomers by free radical induced addition polymerization using peroxy or azo catalysts or the like. Ethylenically unsaturated monomers other than said vinyl unsaturated monomers can include, for example, those monomeric materials exhibiting ethylenic double bond unsaturation such as polymerizable allylic, acrylic, fumaric, maleic, or like ethylenically unsaturated double bond functionality (carbon-to-carbon unsaturation) which can be copolymerized with the vinyl double bond in said vinyl unsaturated monomers. Ethylenically unsaturated monomers other than vinyl unsaturated monomers can include, for example, styrene, methyl styrenes and similar alkyl styrenes, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers.

Less preferred binders, for cost considerations, are acrylic binders having a uniform average particle size less than about 0.5 micron which are particularly suitable for wet adhesion to the substrate as well as providing excellent binding to the diverse non-film-forming components. Acrylic unsaturated monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. The ethylenically unsaturated monomers can be copolymerized by free radical induced addition polymerization using peroxy or azo catalysts, common redox catalysts, ultraviolet radiation, or the like. The particle size of the film-forming binder can be between 500 Å and 5,000 Å and preferably between about 1,000 to 3,000 Å to provide desirable wet adhesion, flowout, leveling, and wet hiding properties to the wet paint film. The film-forming binder should constitute between about 55% to 70% based on the dry solids volume of the film to provide a PVC between about 30% and 45% PVC.

The preferred binders have a glass transition temperature suitable for fusing and coalescing in a film under application or ambient temperature. Air drying paints at ordinary room temperature (25° C.) require a film-forming binder with polymer particles having a glass transition temperature (Tg) of at least 5° C. and preferably at least 15° C. below the coalescing temperature to form a film or binding matrix at the ambient temperature. The glass transition temperatures of the film-forming binder of this invention is at least about 10° C. lower than the Tg of the non-film-forming polymeric particles. Preferably the differential between the film-forming polymer particles and non-film-forming polymer particles is about 30° C. The term "glass transition temperature" is a term well known in the art and generally defines a minimum softening temperature descriptive of long range translational motion of polymer molecules which results in plastic deformation or flow. A polymer particle having a glass transition temperature greater than room temperature will be a non-film-former at room temperature. The glass transition temperature can be measured in accordance with *Journal of Paint Technology*, 41 (530), pages 167–178 (1969). The glass transition temperature (Tg) for a film-forming polymer herein is measured when such polymer particle is in the aqueous latex emulsion paint mixture whereby the interacting effects of the various paint ingredients particularly coalescing solvents are taken into account. Alternatively, the Tg of the film-forming particles can be estimated by Vicat softening point as determined by ASTM Test D-1525.

The latex paint of this invention further contains a minor amount of opacifying pigments which generally have a refractive index of at least about 1.8. Typical white opacifying pigments include rutile and anatase titanium dioxides, lithopone, zinc sulfide, lead titanate, antimony oxide, zirconium oxide, titanium calcium, white lead, titanium barium, zinc oxide, leaded zinc oxide, mixture of the same, and like pigments. The preferred white inorganic opacifying pigment is rutile titanium dioxide having a weight average particle size between about 0.2 to 0.4 microns. Titanium yellow and like pigments having a high refractive index can be utilized as opacifying pigments as well as imparting tints to the paint. Although most opacifying pigments are white, all opacifying pigments having a high index of refraction above about 1.8 should be considered as an opacifying pigment for the purpose of this invention regardless of its tinting (tinctorial) effect on the resulting paint film. Opacifying pigments such as titanium dioxide comprise broadly between about 5% and 20% on a dry volume solids basis of the latex paint. Opacifying pigment appears to efficiently interact with plastic pigment and become uniformly spaced throughout the paint film by the plastic pigment. Ordinary paint films are usually about 1 to 3 mils thick or higher for high build coatings and can be applied by brush or roller.

The latex paint films are formed by coalescence of the film forming binder to form a binding matrix at the ambient paint application temperature to generate a hard, tack-free enamel film. Particularly desirable coalescing solvents are phenyl ether of diethylene glycol, diethylene glycol butyl ether, and dibutyl phthalate, diethylene glycol monobutyl ether acetate or monoethyl ether acetate, and 2,2,4-trimethyl-1,1,3, pentanediol monoisobutyrate. Coalescent is ordinarily utilized at the level of about 15 pounds of coalescent per 100 gallons of latex paint.

The latex paint of this invention can contain tinctorial pigments which are pigmentary materials suitable for imparting a specific hue to the resulting latex emulsion paint. Tinctorial pigments generally include, for example, ferrite yellow oxide, ferric oxide, "brown" iron oxide (which is a blend of red, yellow, and black iron oxides), tan oxide of iron (which is a similar blend), raw sienna, raw and burnt umber, chromium oxide green, phthalocyanine green (chlorinated copper phthalonitrile), the green iron salt of nitroso beta naphthol, copper phthalonitrile blue, ultramarine blue, carbon black, lampblack, toluidine red, parachlor red, para toner (red, alkali resistant red, BON red, and maroon), cadmium reds and yellows, Watchung red, madder lake (red), Duratone red, carmine red, chrome yellow (lead chromate), chrome orange, Hansa yellows and similar tinctorial pigments. Tinctorial pigments can comprise preferably 1% to 6% on a dry solids volume basis.

The latex paint of this invention can contain non-opacifying filler or extender pigments having fairly low refractive indices and little or no opacifying properties but often are included to give body and thickness to the latex paint composition. Non-opacifying fillers and extenders often include clays, talc, wollastonite, barytes, calcium carbonate, silica, mica, and similar filler pigments. Semi-gloss and hard enamel film properties are surprisingly maintained at high PVCs of 30% to 45% PVC and the film integrity properties are surprisingly retained by utilizing certain preferred non-opacifying pigments such as calcined clay, amorphous silica, and diatomaceous silica which increase the interaction of the non-film-forming polymer particles with the binders to provide an excellent hard enamel paint film with excellent other film integrity properties. Non-opacifying filler and extender pigments can comprise between about 0% and 15% of the latex paint on a dry solids volume basis.

The inventive latex emulsion paint can be made in a disperser mill such as a Cowles disperser. Preferably all the paint ingredients except the non-film-forming polymer particles and film-forming binder are first mixed together in the disperser mill, or alternatively, a sand mill, a pebble mill, a roller miller, or a ball mill. Then the non-film-forming polymer particles and film-forming binder are added to the resulting mixture and blended in, suitably with the high speed dispersing mixer or conventional tank stirrer. The resulting paint is an intimate dispersion.

The following Examples illustrate the merits of this invention but should not be construed as limiting the scope of this invention.

EXAMPLE 1

A semi-gloss latex paint was produced from the following components:

|  | Gallons | Pounds |
| --- | --- | --- |
| Water | 7.00 | 58.3 |
| Hydroxyethyl cellulose | 0.10 | 1.0 |
| Non-metallic organic preservative | 0.20 | 2.0 |
| Hydrocarbon defoamer | 0.14 | 1.0 |
| Anionic polymer dispersing agent | 0.45 | 4.0 |
| Nuosperse HOH dispersant | 1.06 | 10.0 |
| Rutile TiO$_2$ | 5.71 | 190 |
| Water | 7.00 | 58.3 |
| Aluminum silicate extender | 2.28 | 50 |

The foregoing components were then mixed with the following components:

|  | Gallons | Pounds |
| --- | --- | --- |
| Non-ionic alkylphinoxypoly ethanol | 0.45 | 4.0 |
| Triethanolamine | 0.21 | 2.0 |
| Water | 5.00 | 41.6 |
| Propylene glycol | 4.63 | 40.0 |
| Thickener | 1.37 | 12.5 |
| Glycol ether solvent | 0.68 | 5.0 |
| Ester-alcohol solvent | 0.63 | 5.0 |
| Hydrocarbon defoamer | 1.00 | 7.0 |
| Plastic pigment 1700 Å polymer particles (99 styrene/1 glacial methacrylic acid) at 52.2% water | 15.73 | 135 |
| Anionic stabilizer-free acid of complex organic phosphate ester | 0.45 | 4.0 |
| Binder latex 57.7% water, 4500 Å; copolymer of 70 vinyl acetate, 30 butyl acrylate, 0.1 glycidal methacrylic acid | 43.14 | 390 |
| Ammonium hydroxide | 0.27 | 2.0 |
| Water | 2.47 | 20.56 |

The foregoing paint had the following characteristics:
29.5% by weight pigment
70.5% by weight vehicle
37% PVC
The paint was tested with the following results:

| 60° Gloss | 40 |
| --- | --- |
| Tint Strength | Excellent |
| Hiding | Excellent |
| Scrub Resistance | Excellent |
| Wet Adhesion | Excellent |
| Enamel Holdout | Excellent |
| Block Resistance (Non-tacking after 24 hours) | Very Good |

TEST METHODS

Surface porosity is measured by enamel holdout wherein the film from the opacity test is subsequently coated with a gloss alkyd enamel using a 1.5 mil Bird applicator. The gloss of the alkyd over the test paint divided by the gloss of the alkyd over the sealed chart alone is defined as the percentage enamel holdout. Higher numbers indicate lower surface porosity. The gloss is measured with a Hunter gloss meter with a 60° incident reading angle.

Surface porosity can be alternatively tested by applying K & N Testing Ink to a film, as with enamel holdout, for two minutes, then removing with paper towels. The penetration of the ink into the paint film causes a darkening in color which is proportional to the porosity of the film which is measured by reading the Y scale reflectance with an IDL Color Eye Spectrophotometer using a white vitrolite standard. Higher numbers indicate lower porosity.

Scrub resistance is measured in accordance with ASTM Test D-2486.

Stain resistance and removal is measured in accordance with ASTM Test D-2198 with the results reported in the manner reported for scrub resistance.

The wet adhesion test indicates wet adhesion of a paint film to a glossy surface. Wet paint film is drawn down by No. 36 rod on 10 and 90, 60° gloss aluminum panels and air dried at room temperature for 16–24 hours. After drying a portion of each test panel can be soaked with water for ½ hour by applying wet towels to the test area. Blister indicates failure. Then scribe a line across the soaked test area, scrub moderately at right angles to the scribe mark with a bristle brush and a solution of Ivory bar soap for 300 double strokes. Note any failures. The panels are air dried and then scribed again at right angles to the first scribe line. Adhesion adjacent to both scribe marks are manually checked.

Block resistance is the non-tackiness of a dried film after 24 hours.

EXAMPLE 2

The paint formula in Example 1 was repeated except that the paint sample did not contain plastic pigment. The paint film had poor wet adhesion and the block resistance after 24 hour air dry was poor.

EXAMPLE 3

The formula in Example 1 was repeated except that the plastic pigment was a homopolystyrene. The wet paint films had low wet adhesion.

EXAMPLE 4

Several paint samples were compounded similar to the paint in Example 1 except the latex binder polymer was varied as indicated in the following table.

| Test | 70 Vinyl Acetate 30 Butyl Acrylate 4500 Å | 86 Vinyl Acetate 14 Butyl Acrylate 4200 Å | Styrene/Acrylic Copolymer 7500 Å | 70 Vinyl Acetate 30 Butyl Acrylate 6900 Å |
|---|---|---|---|---|
| 60° Gloss | 40 | 21 | 15 | 12 |
| Tint Strength | Excellent | Excellent | Excellent | Excellent |
| Hiding | Excellent | Excellent | Excellent | Excellent |
| Scrub | Excellent | Good | Excellent | Good |
| Wet Adhesion | Excellent | Excellent | Excellent | Excellent |
| Enamel Hold-Out | Excellent | Excellent | Excellent | Excellent |

EXAMPLE 5

Several paint samples were compounded according to the formula in Example 1 except that the coalescent type was varied. Tint strength, hiding, scrub, and wet adhesion were excellent. The 60° gloss varied as follows:

| | | 60° Gloss |
|---|---|---|
| (a) | Mixture of glycol ether and ester alcohol solvents | 40 |
| (b) | Tributyl phosphate* | 5* |
| (c) | Hexyl carbitol | 34 |
| (d) | Ethylene glycol monohexyl ether | 40 |
| (e) | Butyl carbitol acetate | 31 |

*Tint Strength was weak and hiding was slightly lower in addition to very low gloss.

EXAMPLE 6

Several paint samples were compounded according to Example 1 except that the copolymerized acid monomer and particle size was varied. The plastic pigments were polystyrene copolymer with the amount and identity of the monomeric acid indicated in the following table.

| | Acid Monomer | Particle Size | 60° Gloss |
|---|---|---|---|
| (a) | 1% Methacrylic acid | 1700 Å | 40 |
| (b) | ½% Methacrylic acid | 6300 Å | 20 |
| (c) | Dow XD-288 Polystyrene | 2000 Å | 38 |
| (d) | Dow XD-8656 | 2311 Å | 38 |
| (e) | Estimated 0.7 Copolymerized acid | 3180 Å | 25 |
| (f) | Estimated 0.5 Copolymerized acid | 3254 Å | 22 |

All of the foregoing paint samples exhibited very good to excellent tint strength, hiding, scrub resistance, wet adhesion, and enamel hold-out.

We claim:

1. An aqueous latex dispersion paint composition which coalesces at an ambient coalescing temperature into a semi-gloss hardened continuous paint film, said latex paint having about 30% to 70% by weight total solids and comprising on a dry solids volume basis:
    55% to 70% of a film-forming latex binder having a major weight portion of polymer particles between about 500 Å and 5000 Å and having a glass transition temperature at least about 5° C. below said coalescing temperature whereby said binder particles will coalesce into a binding matrix, said binder particles being a vinyl copolymer comprising by weight at least 40% polymerized vinyl unsaturated monomers;
    10% to 25% of solid, non-cellular, non-film-forming polymer particles having a weighted average diameter between about 1000 Å and 5000 Å and having a glass transition temperature at least about 30° C. above the glass transition temperature of said binder, said non-film-forming polymer particles being polymerized ethylenicaly unsaturated monomers containing between 0.2% and 2% of copolymerized acid monomer selected from acrylic acid or methacrylic acid;
    5% to 20% opacifying pigment having a refractive index of at least about 1.8;
    0% to 15% of non-opacifying pigment; and said latex paint having a pigment-volume-content (PVC) between about 30% and 45% PVC but less than critical-PVC as measured by opacity.

2. The latex paint in claim 1 wherein the binder is a vinyl copolymer containing between 80% and 100% by weight copolymerized vinyl monomer.

3. The latex paint in claim 1 wherein the binder contains polymer particles having an average size between 1000 Å and 3000 Å.

* * * * *